United States Patent
Kim et al.

(10) Patent No.: US 8,311,492 B2
(45) Date of Patent: Nov. 13, 2012

(54) SIMPLE BLOCK SPACE TIME TRANSMIT DIVERSITY USING MULTIPLE SPREADING CODES

(75) Inventors: Younglok Kim, Seoul (KR); Ariela Zeira, Huntington, NY (US)

(73) Assignee: InterDigital Technology Corporation, Wilmington, DE (US)

(*) Notice: Subject to any disclaimer, the term of this patent is extended or adjusted under 35 U.S.C. 154(b) by 223 days.

(21) Appl. No.: 12/627,630

(22) Filed: Nov. 30, 2009

(65) Prior Publication Data
US 2010/0074242 A1    Mar. 25, 2010

Related U.S. Application Data

(63) Continuation of application No. 10/107,465, filed on Mar. 27, 2002, now abandoned, which is a continuation of application No. 09/999,287, filed on Nov. 15, 2001, now abandoned.

(60) Provisional application No. 60/254,013, filed on Dec. 7, 2000.

(51) Int. Cl.
*H04B 1/02* (2006.01)

(52) U.S. Cl. ..................................... 455/101

(58) Field of Classification Search .......... 370/328–330, 370/335–338, 340–345, 347–348; 455/91, 455/95, 101, 103, 107; 375/146–147, 220, 375/260, 267, 299, 347–349
See application file for complete search history.

(56) References Cited

U.S. PATENT DOCUMENTS

| | | | |
|---|---|---|---|
| 5,491,692 A * | 2/1996 | Gunner et al. | 370/402 |
| 5,652,764 A | 7/1997 | Kanzaki et al. | |
| 5,886,987 A | 3/1999 | Yoshida et al. | |
| 6,115,406 A | 9/2000 | Mesecher et al. | |
| 6,317,411 B1 * | 11/2001 | Whinnett et al. | 370/204 |
| 6,356,528 B1 | 3/2002 | Lundby et al. | |
| 6,449,314 B1 * | 9/2002 | Dabak et al. | 375/267 |
| 6,564,645 B1 | 5/2003 | Nakano et al. | |
| 6,570,889 B1 | 5/2003 | Stirling-Gallacher et al. | |
| 6,594,473 B1 * | 7/2003 | Dabak et al. | 455/101 |
| 6,606,314 B1 | 8/2003 | Bahrenburg et al. | |
| 6,628,702 B1 | 9/2003 | Rowitch et al. | |

(Continued)

FOREIGN PATENT DOCUMENTS

CN    1182990    5/1998

(Continued)

OTHER PUBLICATIONS

Kocian, A.; Fleury, B.H.; Iterative Joint Symbol Detection and Channel Estimation for DS/CDMA Via the SAGE Algorithm, Personal, Indoor and Mobile Ratio Communications, 2000. PIRMC 2000. The 11th IEEE International Symposium on, IEEE (Sep. 2000), vol. 2, pp. 1410-1414.

(Continued)

*Primary Examiner* — Thai Hoang
(74) *Attorney, Agent, or Firm* — Volpe and Koenig, P.C.

(57) ABSTRACT

A base station and user equipment (UE) for use in a CDMA communication system are disclosed. The base station includes a first and second antenna for transmitting first and second communication bursts. The first channelization device spreads data using a first channelization code and the second channelization device spreads the data using a second channelization code. The UE has a data detection device for receiving a signal including the first and second communication bursts.

5 Claims, 4 Drawing Sheets

U.S. PATENT DOCUMENTS

| | | | | |
|---|---|---|---|---|
| 6,643,338 B1* | 11/2003 | Dabak et al. | | 375/347 |
| 6,721,300 B1* | 4/2004 | Akiba et al. | | 370/342 |
| 6,728,302 B1* | 4/2004 | Dabak et al. | | 375/148 |
| 6,748,024 B2* | 6/2004 | Kuchi et al. | | 375/299 |
| 6,775,260 B1* | 8/2004 | Dabak et al. | | 370/342 |
| 6,775,329 B2* | 8/2004 | Alamouti et al. | | 375/267 |
| 6,778,592 B1 | 8/2004 | Haga et al. | | |
| 6,788,661 B1* | 9/2004 | Ylitalo et al. | | 370/334 |
| 6,804,307 B1* | 10/2004 | Popovic | | 375/299 |
| 6,804,311 B1* | 10/2004 | Dabak et al. | | 375/347 |
| 6,862,275 B1* | 3/2005 | Dabak | | 370/342 |
| 6,865,237 B1* | 3/2005 | Boariu et al. | | 375/295 |
| 6,917,597 B1* | 7/2005 | Schmidl et al. | | 370/280 |
| 7,020,175 B2* | 3/2006 | Frank | | 375/130 |
| 7,085,295 B2* | 8/2006 | Gurski et al. | | 370/520 |
| 7,139,324 B1* | 11/2006 | Ylitalo et al. | | 375/267 |
| 7,154,958 B2* | 12/2006 | Dabak et al. | | 375/267 |
| 2001/0033614 A1* | 10/2001 | Hudson | | 375/229 |
| 2002/0012380 A1* | 1/2002 | Hottinen et al. | | 375/130 |
| 2002/0018529 A1* | 2/2002 | Dabak et al. | | 375/267 |
| 2002/0060996 A1* | 5/2002 | Kwak et al. | | 370/335 |
| 2002/0080894 A1* | 6/2002 | Dabak et al. | | 375/316 |
| 2002/0090038 A1* | 7/2002 | Dabak et al. | | 375/316 |
| 2002/0172293 A1* | 11/2002 | Kuchi et al. | | 375/267 |
| 2002/0181430 A1* | 12/2002 | Thomas et al. | | 370/342 |
| 2003/0012318 A1* | 1/2003 | Piirainen | | 375/358 |
| 2003/0021352 A1* | 1/2003 | Benning et al. | | 375/267 |
| 2003/0067993 A1* | 4/2003 | Viswanathan | | 375/267 |
| 2003/0128678 A1* | 7/2003 | Subrahmanya et al. | | 370/335 |
| 2004/0190603 A1* | 9/2004 | Dabak et al. | | 375/148 |

FOREIGN PATENT DOCUMENTS

| | | |
|---|---|---|
| EP | 0957604 | 11/1999 |
| EP | 0993129 | 4/2000 |
| EP | 0996234 | 4/2000 |
| EP | 1018808 | 7/2000 |
| WO | 97/37456 | 10/1997 |
| WO | 99/07090 | 2/1999 |
| WO | 9907090 | 2/1999 |
| WO | 0064073 | 1/2000 |
| WO | 00/24133 | 4/2000 |
| WO | 0024133 | 4/2000 |
| WO | 00/64073 | 10/2000 |
| WO | 0064073 | 10/2000 |
| WO | 01/05060 | 1/2001 |
| WO | 0105060 | 1/2001 |

OTHER PUBLICATIONS

Dabak, A.; Hosur, S.; Negi, R.; Space Time Block Coded Transmit Antenna Diversity Scheme for WCDMA, Wireless Communications and Networking Conference, 1999. WCNC. 1999, IEEE (Sep. 1999), vol. 3, pp. 1466-1469.

Kanzaki et al., "A Code and Space Diversity of the CDMA Broadcast Channels," Proceedings of General Conference of the Institute of Electronics, Information, and Communication Engineers, B-413, p. 413 (Mar. 10, 1995).†.

Kocian, A.; Fleury, B.H.; Iterative Joint Symbol Detection and Channel Estimation for DS/CDMA Via the SAGE Algorithm, Personal, Indoor and Mobile Ratio Communications, 2000. PIMRC 2000. The 11th IEEE International Symposium on, IEEE (Sep. 2000), vol. 2, pp. 1410-1414.

Li et al., "Channel Estimation for OFDM Systems with Transmitter Diversity in Mobile Wireless Channels," IEEE Journal on Selected Areas in Communications, vol. 17, No. 3, (Mar. 1999).

Li Gang; Zhao Ming; Yao Yan; the Implement of Optimum Demodulator for STTD in WCDMA, Communication Technology Proceedings, 2000. WCC-ICCT 2000. International Conference on, (Aug. 2000), vol. 2, pp. 1534-1537.

Popovic, "Class of Binary Sequences for Mobile Channel Estimation," Electronics Letters, vol. 31, No. 12, pp. 944-945 (Jun. 8, 1995).

Third Generation Partnership Project, "Technical Specification Group Radio Access Networks; UTRA (UE) TDD; Radio Transmission and Reception (Release 4)," 3GPP TS 25.102 V4.2.0 (Sep. 2001).

Third Generation Partnership Project, "Technical Specification Group Radio Access Networks; UTRA (UE) TDD; Radio Transmission and Reception (Release 1999)," 3GPP TS 25.102 V3.8.0 (Sep. 2001).

Third Generation Partnership Project, "Technical Specification Group Radio Access Networks; UTRA (UE) TDD; Radio Transmission and Reception (Release 1999)," 3GPP TS 25.102 V3.4.0 (Oct. 2000).

Third Generation Partnership Project, "Technical Specification Group Radio Access Network; Physical Layer Procedures (TDD) (Release 1999)," 3GPP TS 25.224 V3.8.0 (Sep. 2001).

Third Generation Partnership Project, "Technical Specification Group Radio Access Network; Physical channels and mapping of transport channels onto physical channels (TDD) (Release 1999)," 3GPP TS 25.221 V3.4.0 (Sep. 2000).

Third Generation Partnership Project, "Technical Specification Group Radio Access Network; Physical channels and mapping of transport channels onto physical channels (TDD) (Release 1999)," 3GPP TS 25.221 V3.8.0 (Sep. 2001).

Third Generation Partnership Project, "Technical Specification Group Radio Access Network; Physical channels and mapping of transport channels onto physical channels (TDD) (Release 4)," 3GPP TS 25.221 V4.2.0 (Sep. 2001).

Third Generation Partnership Project, "Technical Specification Group Radio Access Network; Spreading and modulation (TDD) (Release 1999)," 3GPP TS 25.223 V3.4.0 (Sep. 2000).

Third Generation Partnership Project, "Technical Specification Group Radio Access Network; Spreading and modulation (TDD) (Release 1999)," 3GPP TS 25.223 V3.7.0 (Sep. 2001).

Third Generation Partnership Project, "Technical Specification Group Radio Access Network; Physical channels and mapping of transport channels onto physical channels (FDD) (3G TS 25.211 version 3.0.0)," 3G TS 25.211 V3.0.0 (Oct. 1999).

Third Generation Partnership Project, "Technical Specification Group (TSG); Radio Access Network (RAN); 1.28Mcps functionality for UTRA TDD Physical Layer (Release 4)," 3GPP TR 25.928 V4.0.1 (Mar. 2001).

Third Generation Partnership Project, "Technical Specification Group Radio Access Network; Physical channels and mapping of transport channels onto physical channels (FDD) (Release 1999)," 3GPP TS 25.211 V3.4.0 (Sep. 2000).

Third Generation Partnership Project, "Technical Specification Group Radio Access Network; Physical channels and mapping of transport channels onto physical channels (FDD) (Release 1999)," 3GPP TS 25.211 V3.8.0 (Sep. 2001).

ETSI TS 125 224 V 3.4.0 (Sep. 2000), Universal Mobile Telecommunications System (UMTS); Physical Layer Procedures (TDD) (3GPP TS 25.224 version 3.4.0 Release 1999).

ETSI TS 125 224 V4.2.0 (Sep. 2001), Universal Mobile Telecommunications System (UMTS); Physical Layer Procedures (TDD) (3GPP TS 25.224 version 4.2.0 Release 4).

Editor, "TR 25.928, 1.28Mcps functionality for UTRA TDD Physical Layer," Meeting #14, TSGR1#14 R1-00-0960 (Jul. 2000).

Li et al., "Channel Estimation for OFDM Systems with Transmitter Diversity in Mobile Wireless Channels," IEEE Journal on Selected Areas in Communications, vol. 17, No. 3 (Mar. 1999).

Dabak, A.; Hosur, S.; Negi, R.; Space Time Block Coded Transmit Antenna Diversity Scheme for WCDMA, Wireless Communications and Networking Conference, 1999. WCNC. 1999, IEE (Sep. 1999), vol. 3, pp. 1466-1469.

Li Gang; Zhao Ming; Yao Yan; the Implement of Optimum Demodulator for STTD in WCDMA, Communication Technololgy Proceedings, 2000. WCC-ICCT 2000. International Conference on, (Aug. 2000), vol. 2, pp. 1534-1537.

* cited by examiner

SIMPLE BLOCK SPACE TIME TRANSMIT DIVERSITY USING MULTIPLE SPREADING CODES

CROSS REFERENCE TO RELATED APPLICATIONS

This application is a continuation of U.S. patent application Ser. No. 10/107,465, filed Mar. 27, 2002, which is a continuation of U.S. patent application Ser. No. 09/999,287, filed Nov. 15, 2001, which claims the benefit of U.S. Provisional Patent Application No. 60/254,013, filed on Dec. 7, 2000, all of which are incorporated by reference herein as if fully set forth.

BACKGROUND

The present invention relates to communications systems imploring code division multiple access (CDMA) techniques. More particularly, the present invention relates to a transmission diversity scheme which can be applied to a CDMA communication system.

Spacial diversity has been proposed for support of very high data rate users within third generation wide band code division multiple access systems such as CDMA. Using multiple antennas, the systems achieve better gains and link quality, which results in increased system capacity. Classically, diversity has been exploited through the use of either beam steering or through diversity combining.

More recently, it has been realized that coordinated use of diversity can be achieved through the use of space-time codes. Such systems can theoretically increase capacity by up to a factor equaling the number of transmit and receive antennas in the array. Space-time block codes operate on a block of input symbols producing a matrix output over antennas and time.

In the past, space-time transmit diversity systems have transmitted consecutive symbols simultaneously with their complex conjugates. This type of system, though may result in symbol overlap at the receiving end, with the amount of overlap being dependent on the length of the impulse response of the propagation channel. In time division duplex (TDD) mode, this symbol overlap will have to be accounted for in the joint detection receiver. The joint detector will have to estimate the transmitted symbols and their conjugates, resulting in an increase in complexity of the joint detection.

In order to alleviate this increase in joint detection, systems have been created which transmit two similar but different data fields. The first data field, having a first portion, $D_1$, and a second portion, $D_2$, is transmitted by the first antenna. A second data field is produced by modifying the first data field. The negation of the conjugate of $D_2$, $-D_2^*$, is the first portion of the second data field and the conjugate of $D_1$, $D_1^*$, is the second portion. The second data field is simultaneously transmitted by the second antenna. This type of system results in the joint detection implemented at the receiver needing only to estimate the same amount of symbols as in the case of a single transmit antenna. A block diagram of this system is illustrated in FIG. 1.

Although the above system reduces the complexity of joint detection for a single data block, joint detection requires the use of two joint detectors at the receiver in a system employing two transmit diversity antennas. Each joint detection device estimates the data from one of the antennas. The estimated data is combined to produce the original data. Therefore, the receiver in such a system has a high complexity resulting in higher receiver expense.

Accordingly, there exists a need for a transmit diversity system requiring less complexity and receiver expense.

SUMMARY

A base station and user equipment (UE) for use in a CDMA communication system are disclosed. The base station includes a first and second antenna for transmitting first and second communication bursts. The first channelization device spreads data using a first channelization code and the second channelization device spreads the data using a second channelization code. The UE has a data detection device for receiving a signal including the first and second communication bursts.

DETAILED DESCRIPTION OF THE PREFERRED EMBODIMENTS

Figure 1:
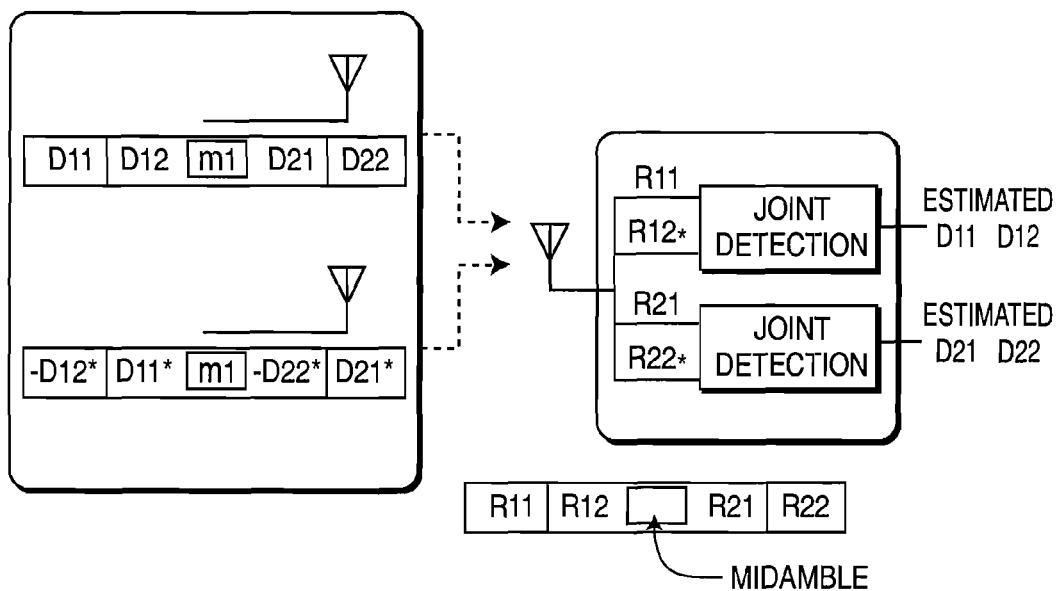
FIG. 1 is a block diagram of a prior art communication system employing space-time transmit diversity.
Figure 2:
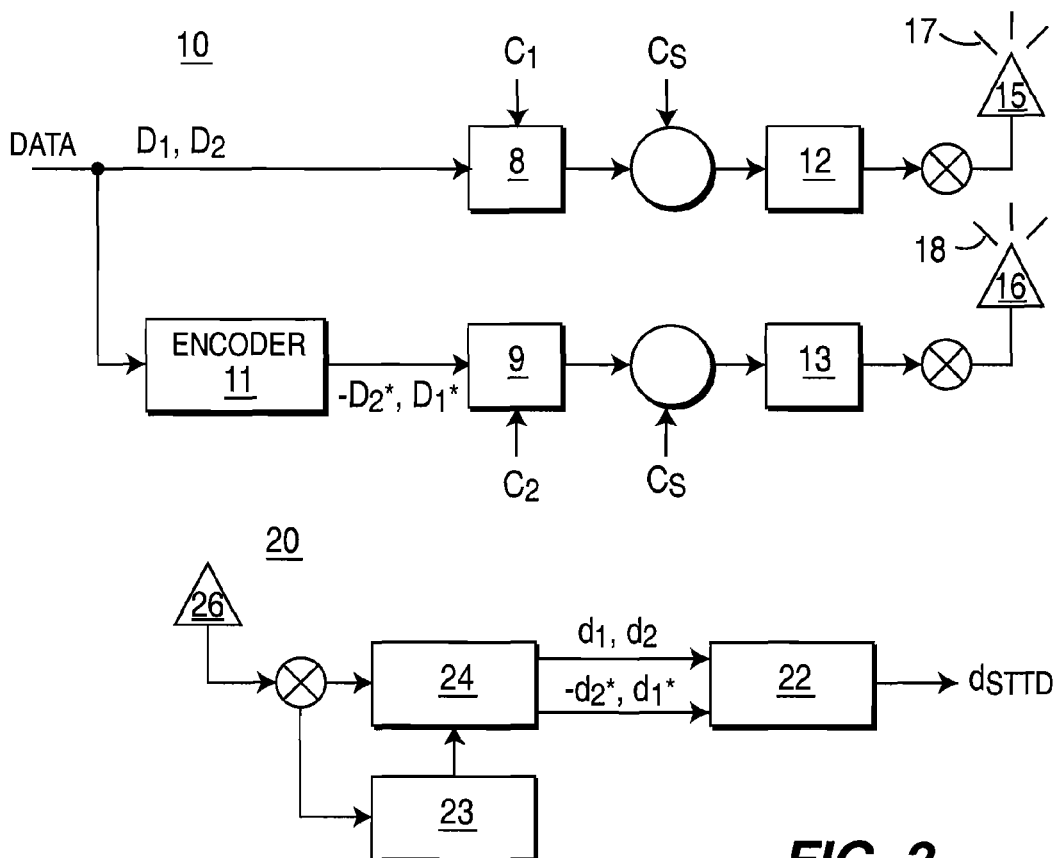
FIG. 2 is a block diagram of a transmitter and receiver in a communication system in accordance with the preferred embodiment of the present invention.

FIG. 2 is a block diagram of a transmitter 10, preferably located at a base station, and a receiver 20, preferably located at a user equipment (UE), in a CDMA communication system in accordance with the preferred embodiment of the present invention. Although it is preferable to have the transmitter located at a base station and the receiver located at the UE, the receiver and transmitter may switch locations and the present invention operate on an uplink communication. The transmitter 10 comprises a block encoder 11, a plurality of channelization devices 8, 9, a plurality of spreading sequence insertion devices 12, 13, and a plurality of antennas 15, 16. Although FIG. 1 illustrates a transmitter comprising two (2) antennas, it should be apparent to those having skill in the art that more than two (2) antennas may be used, such as N antennas.

A typical communication burst has two data fields separated by a midamble sequence. Preferably, the same encoding procedure, as discussed in the following, for one data field is also performed on the other data field. Data to be transmitted by the transmitter 10 is produced by a data generator (not shown). The resulting data symbols $(S_1, S_2, \ldots S_{N/2}), (S_{N/2+1}, S_{N/2+2}, \ldots, S_N)$ of the first data field, which can be represented by sub-data fields $D_1$ and $D_2$, are input into the block encoder 11, preferably a block space-time transmit diversity (BSTTD) encoder. The block encoder 11 encodes the input symbols and generates the complex conjugate of $D_1$ and the negation of the conjugate of $D_2$: $D_1^*$, $-D_2^*$. The encoder 11 also changes the order of the symbols so that $-D_2^*$ is ahead of $D_1^*$. Preferably, an analogous encoding of the second data field is also performed.

In accordance with the preferred embodiment of the present invention, the data fields, $D_1$, $D_2$ and $-D_2^*$, $D_1^*$ are forwarded to a first and second channelization device 8, 9, respectively. The first channelization device 8 spreads the data blocks $D_1$, $D_2$ by a first channelization code, and $-D_2^*$, $D_1^*$ by the second channelization device 9 using a second different channelization code. Each of the spread data blocks from the first and second channelization devices 8, 9 are then scrambled by the scrambling code associated with the transmitter 10.

Once the symbols $D_1$, $D_2$, $-D_2^*$, $D_1^*$ have been scrambled, they are mixed with a first and second midamble through training sequence insertion devices 12, 13, producing two communication bursts 17, 18. The two bursts 17, 18 are modulated and simultaneously transmitted to the receiver 20 over antenna 15 and diversity antenna 16, respectively.

The receiver 20 comprises a joint detection device (JD) 24, a BSTTD decoder 22, a channel estimation device 23 and an antenna 26. The antenna 26 of the UE receives various RF signals including the communication bursts 17, 18 from the transmitter 10. The RF signals are then demodulated to produce a baseband signal.

The baseband signal is then forwarded to the joint detection device 24 and the channel estimation device 23. As those skilled in the art know, the channel estimation device 23 provides channel information, such as channel impulse responses, to the joint detection device 24.

The joint detection device 24, coupled to the channel estimation device 23 and BSTTD decoder 22, utilizes the channel information and the channelization codes to detect the soft data symbols $d_1$, $d_2$, $-d_2^*$, $d_1^*$ in the received signal. The channel impulse response for each burst is determined using that burst's midamble sequence. Since each burst was transmitted using a different spreading code, the joint detection device 24 treats each burst as being transmitted by a different user. As a result, any joint detection device which can recover data from different transmitter sites may be used. Such joint detection devices include zero forcing block linear equalizers, detection devices using Cholesky or approximate Cholesky decomposition, as well as many others. The joint detection device 24 estimates the data symbols of each of the bursts 17, 18 output by the transmitter antennas 15, 16 and forwards the estimates to the BSTTD decoder 22.

The BSTTD decoder 22, coupled to the joint detection device 24, receives the estimated soft data symbols $d_1$, $d_2$ and $-d_2^*$, $d_1^*$ corresponding to the antennas 15, 16 and decodes the symbols to yield a single data field's soft symbols, $d_{STTD}$.

Figure 3:
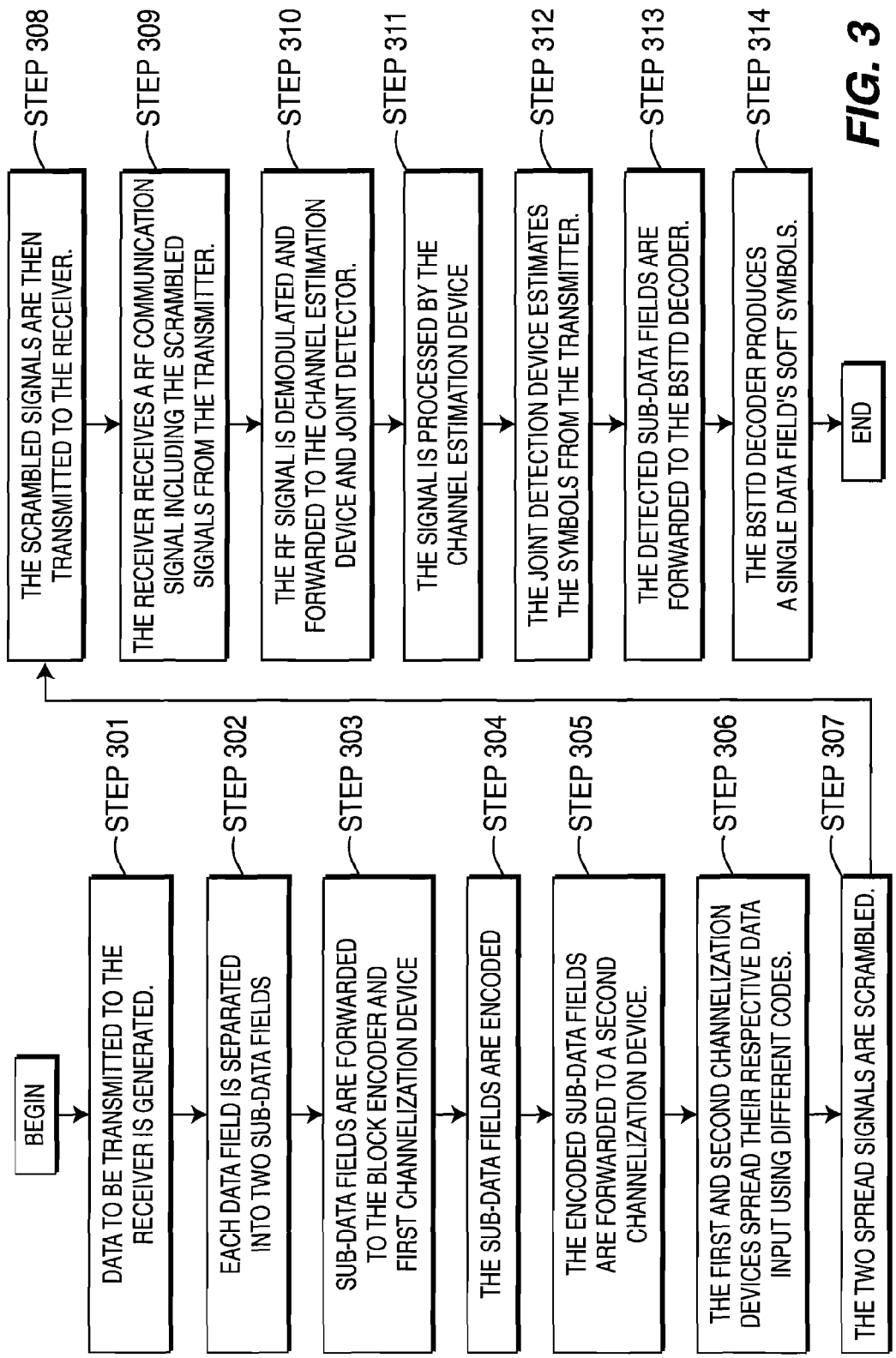
FIG. 3 is a flow diagram of the transmit diversity system of the present invention.

The flow diagram of the present invention is illustrated in FIG. 3. A data generator generates data to be transmitted to the receiver 20 (step 301). Each data field is separated into two sub-data fields $D_1$, $D_2$ (step 302). The sub-data fields $D_1$, $D_2$ are forwarded to the block encoder 11 and the first channelization device 8 (step 303). The sub-data fields forwarded to the block encoder 11 are encoded (step 304) and forwarded to the second channelization device 9 (step 305). Each channelization device 8, 9 spreads their respective data input using a separate channelization code associated with a respective antenna 15, 16 (step 306). The two spread signals are then scrambled, using the scrambling code associated with the base station (step 307) and transmitted to the receiver 20 over diversity antennas 15, 16 (step 308).

The receiver 20 receives a RF communication signal including the two spread signals from the diversity antennas 15, 16 (step 309), demodulates the signal and forwards the demodulated signal to the channel estimation device 23 and joint detection device 24 (step 310). The received signal is processed by the channel estimation device 23 (step 311) and the channel information applied by the joint detection device 24 along with the channelization codes, to estimate the transmit symbols from the diversity antennas 15, 16 (step 312). The detected sub-data fields, corresponding to each diversity antenna 15, 16, are forwarded to the BSTTD decoder (step 313), which decodes the soft symbol sub-fields to yield a single data field's soft symbols, $d_{STTD}$ (step 314).

Figure 5:
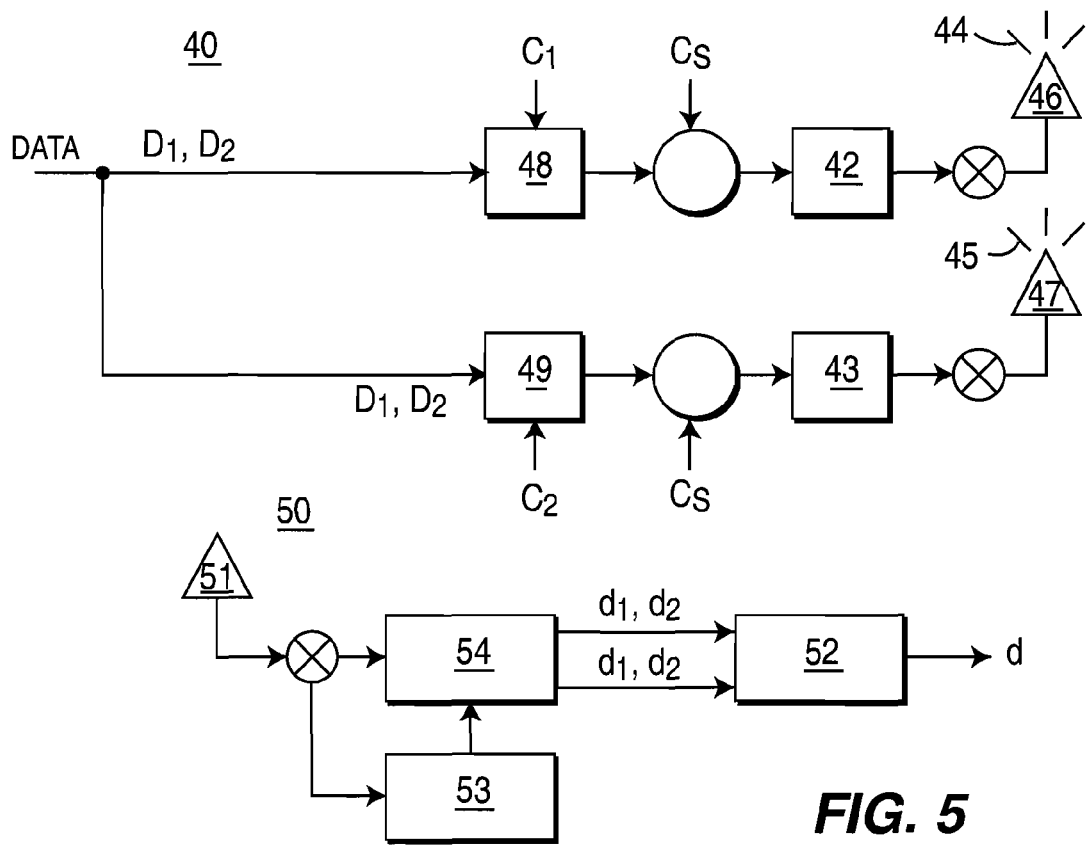
FIG. 5 is a block diagram of a transmitter and receiver in a communication system in accordance with an alternative embodiment of the present invention.

Similar to the preferred embodiment disclosed above, FIG. 5 is a block diagram of an alternative transmitter 40, preferably located at a base station, and a receiver 50, preferably located a user equipment (UE) in a communication system. The transmitter 40 comprises a plurality of channelization devices 48, 49, a plurality of spreading sequence insertion devices 42, 43, and a plurality of antennas 45, 46.

Data to be transmitted by the transmitter 40 is produced by a data generator (not shown). The resulting data symbols ($S_1$, $S_2$, ... $S_{N/2}$), ($S_{N/2}+1$, $S_{N/2}+2$, ... $S_N$) of the first data field, which can be represented by sub-data fields $D_1$ and $D_2$, are input to a first and second channelization device 48, 49, respectively. The first channelization device 8 spreads the data blocks $D_1$, $D_2$ by a first channelization code, and the second channelization device 49 spreads the data blocks $D_1$, $D_2$ by a second different channelization code. Each of the spread data blocks from the first and second channelization devices 48, 49 are scrambled by the scrambling code associated with the transmitter 40.

Once the symbols have been scrambled, they are mixed with a first and second midamble through training sequence insertion devices 42, 43, producing two communication bursts 44, 45. The two bursts 44, 45 are modulated and simultaneously transmitted to the receiver 50 over antenna 46 and diversity antenna 47, respectively.

The receiver 50 comprises a joint detection device (JD) 54, a decoder 22, a channel estimation device 53 and an antenna 51. The antenna 51 of the UE receives various RF signals including the communication bursts 44, 45 from the transmitter 40. The RF signals are then demodulated to produce a baseband signal.

The baseband signal is then forwarded to the joint detection device 54 and the channel estimation device 53. The joint detection device 54, coupled to the channel estimation device 53 and decoder 52, utilizes the channel information and the channelization codes to detect the soft data symbols $d_1$, $d_2$, in the received signal. The channel impulse response for each burst is determined using that burst's midamble sequence. Since each burst was transmitted using a different spreading code, the joint detection device 54 treats each burst as being transmitted by a different user. The joint detection device 54 estimates the data symbols of each of the signals 44, 45 output by the transmitter antennas 46, 47 and forwards the estimates to the decoder 52.

The decoder 52, coupled to the joint detection device 54, receives the estimated soft data symbols $d_1$, $d_2$ corresponding to the antennas 46, 47 and decodes the symbols to yield a single data field's soft symbols, d.

Figure 6:
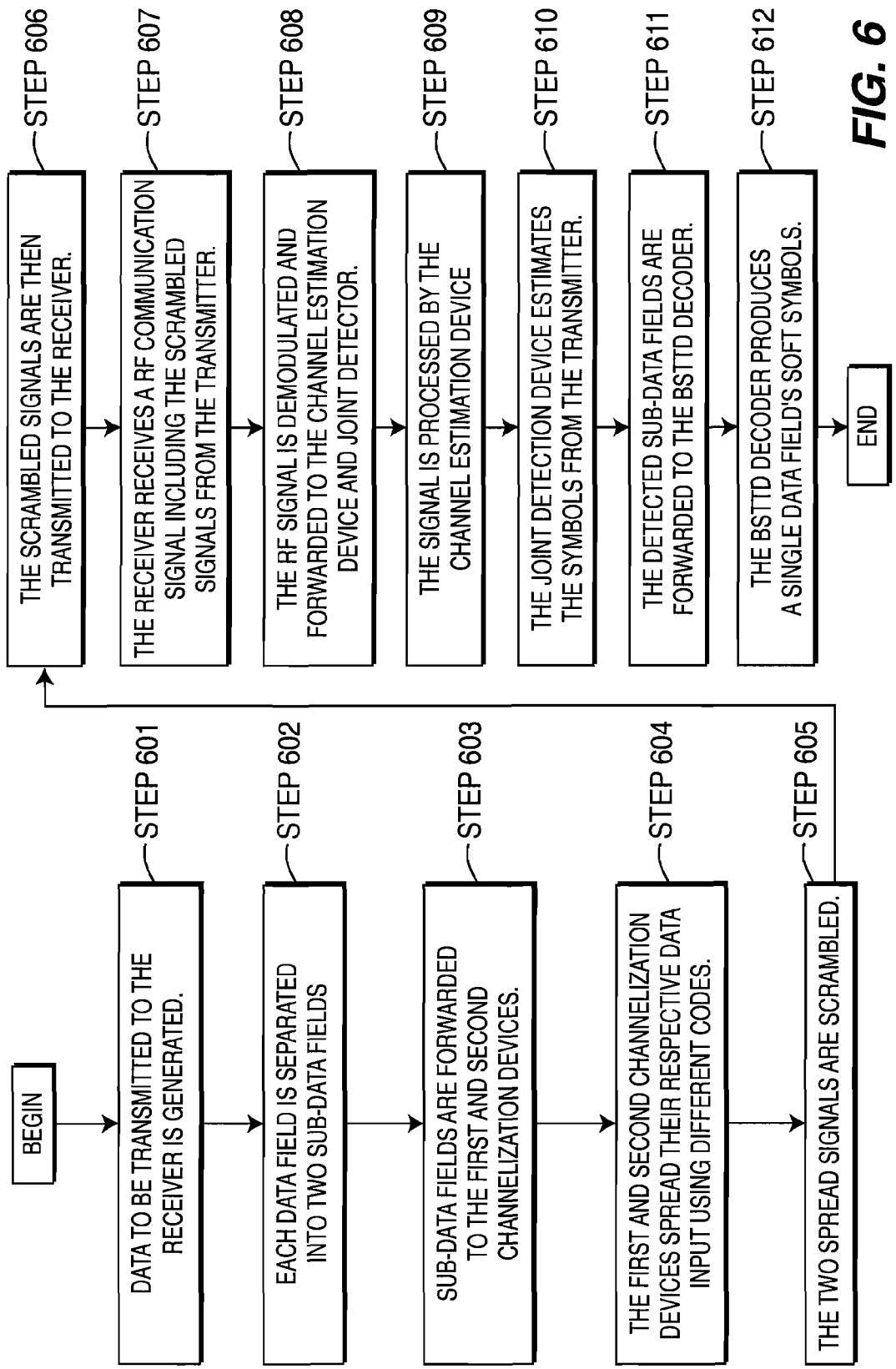
FIG. 6 is a flow diagram of an alternative transmit diversity system of the present invention.

The flow diagram of the alternative embodiment is illustrated in FIG. 6. A data generator generates data to be transmitted to the receiver 40 (step 601). Each data field is separated into two sub-data fields $D_1$, $D_2$ (step 602). The sub-data fields $D_1$, $D_2$ are forwarded to the first channelization device 48 and to the second channelization device 49 (step 603). Each channelization device 48, 49 spreads their respective data input using a separate channelization code associated with each antenna 46, 47 (step 604). The two spread signals are then scrambled, using the scrambling code associated with the base station (step 605) and transmitted to the receiver 50 over diversity antennas 46, 47 (step 606).

The receiver 50 receives a RF communication signal including the two spread signals from the diversity antennas 46, 47 (step 607), demodulates the signal and forwards the demodulated signal to the channel estimation device 53 and joint detection device 54 (step 608). The received signal is processed by the channel estimation device 53 (step 609) and the channel information applied by the joint detection device 54 along with the channelization codes, to estimate the transmit symbols from the diversity antennas 46, 47 (step 610). The detected sub-data fields, corresponding to each diversity antenna 46, 47, are forwarded to the decoder 52 (step 611), which decodes the soft symbol sub-fields to yield a single data field's soft symbols, $d_{STTD}$ (step 612).

By using additional channelization codes, the above approaches can be applied to an antenna array having any number of antennas. Each antenna has its own associated channelization code and midamble. If a block encoder is used, the data field transmitted by each of the antennas has a unique encoding, allowing the use of a single joint detector at the receiver.

Figure 4:
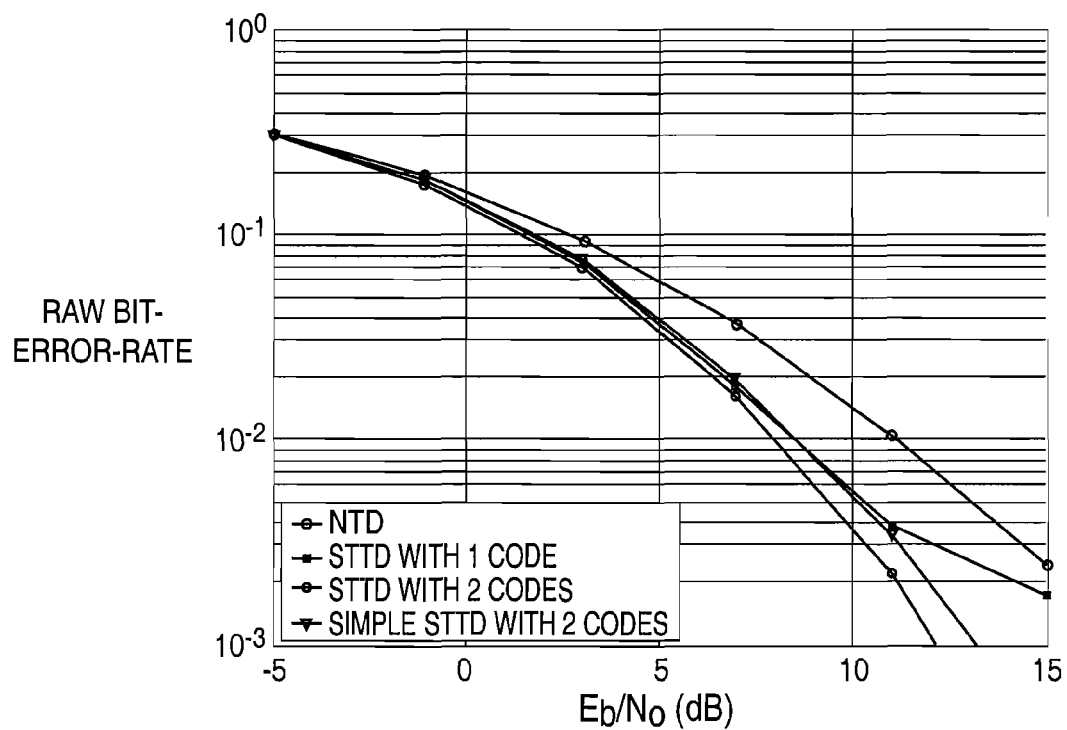
FIG. 4 is a graph of the performance of the transmit diversity system of the present invention.

The BSTTD transmitter with two channelization codes of the present invention allows for the use of a cheaper and simpler method of transmit diversity. The use of different channelization codes per transmit antenna requires only one joint detection device at the receiver resulting in a less complex receiver system than those of the prior art. FIG. 4 is a graph showing the raw BER of various block STTD decoders. The model is based on all the receivers using a block linear equalizer (BLE) based approach to JD. NTD means the single antenna case, i.e., no transmit diversity. STTD with 1 code is the traditional block STTD JD. STTD with 2 code is the disclosed block STTD transmitter. Simple STTD with 2 code is the transmission system disclosed in the alternative embodiment. As illustrated, the benefit of 2 codes for STTD can be summarized as follows: 1) there is up to a 0.5 dB gain at 0.01 raw Bit error rate over 1 code STTD; and 2) by eliminating the encoding block in simple STTD with 2 code, the performance degradation is only 0.2 dB at 0.1 raw BER and no degradation at 0.01 raw BER. The performance improvement over NTD is still 1.0 dB and 2.7 dB at 0.1 and 0.01 raw BER.

What is claimed is:

1. A system for diversity transmission, the system comprising:
   a base station, comprising:
      a first channelization device to receive data and spread the data with a first channelization code to produce a first spread data field, and wherein the first channelization code is utilized exclusively for transmission on the first antenna;
      a second channelization device to receive the same data as the first channelization device and spread the received data with a second channelization code that is different from the first channelization code to produce a second spread data field, and wherein the second channelization code is utilized exclusively for transmission on the second antenna;
      a first training sequence device in communication with the first channelization device, the first training sequence device to combine the first spread data field with a first midamble to produce a first communication burst, the first midamble for estimating a channel impulse response;
      a second training sequence device in communication with the second channelization device, the second training sequence device to combine the second spread data field with a second midamble to produce a second communication burst, the second midamble for estimating a channel impulse response;
      a first scrambling device to scramble the first spread data field by a scrambling code associated with the base station;
      a second scrambling device to scramble the second spread data field by the scrambling code associated with the base station;
      a first diversity antenna to transmit the first communication burst; and
      a second diversity antenna to transmit the second communication burst; and
   a user equipment, comprising:
      a data detection device having an input configured to receive the signal being diversity transmitted, the received signal having the first communication burst and the second communication burst, the first and second communication bursts being transmitted from the same base station in a same time slot over different antennas and the first and second communication bursts having the same data in a same order, each of the first and second communication bursts having the inserted midamble training sequence used for estimating a channel impulse response, and a scrambling code associated with a transmitting base station, the data detection device configured to process the received signal with the first channelization code associated with the first transmission antenna to produce first data and the data detection device configured to process the received signal with the second channelization associated with the second transmission antenna to produce second data, wherein the first and second data are the same data.

2. The system of claim 1 further comprising a decoder configured to process the first and second data to produce the same data.

3. The system of claim 1 wherein the data detection device is a joint detection device.

4. The system of claim 1 further comprising a channel estimation device configured to provide the channel impulse response estimates for the first and second communication bursts to the data detection device using the inserted midamble training sequences.

5. The system of claim 1 wherein the data detection device is further configured to descramble the first and second communication bursts using the scrambling code associated with the base station.

* * * * *